(12) United States Patent
Sato et al.

(10) Patent No.: US 8,753,760 B2
(45) Date of Patent: Jun. 17, 2014

(54) SECONDARY BATTERY WITH GAS RELEASE VALVE

(75) Inventors: Yutaka Sato, Hitachinaka (JP); Takuro Tsunaki, Mito (JP); Ryuji Kohno, Mito (JP); Takashi Sasaki, Hiratsuka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 533 days.

(21) Appl. No.: 13/029,407

(22) Filed: Feb. 17, 2011

(65) Prior Publication Data

US 2011/0212350 A1 Sep. 1, 2011

(30) Foreign Application Priority Data

Feb. 26, 2010 (JP) ................. 2010-041792

(51) Int. Cl.
*H01M 2/12* (2006.01)

(52) U.S. Cl.
USPC .......................................... 429/56

(58) Field of Classification Search
USPC ............... 429/53, 56, 82; 137/68.19, 68.21, 137/68.22, 68.23, 68.27
See application file for complete search history.

(56) References Cited

U.S. PATENT DOCUMENTS

| 5,677,076 A * | 10/1997 | Sato et al. ............ 429/56 |
| 6,346,342 B1 * | 2/2002 | Li ........................ 429/56 |
| 2001/0027807 A1 * | 10/2001 | Morishita et al. ........ 137/68.27 |
| 2003/0131880 A1 * | 7/2003 | Marubayashi et al. ..... 137/68.27 |

FOREIGN PATENT DOCUMENTS

| JP | 63-60273 U | 4/1988 |
| JP | 3222418 B2 | 8/2001 |
| JP | 2001-266827 A | 9/2001 |
| JP | 2001266827 A * | 9/2001 | ............ H01M 2/12 |
| JP | 2002-8615 A | 1/2002 |
| JP | 2002-329485 A | 11/2002 |
| JP | 4155734 B2 | 7/2008 |

OTHER PUBLICATIONS

Japanese Office Action dated Jun. 5, 2012 with English translation (seven (7) pages).

\* cited by examiner

*Primary Examiner* — Carlos Barcena
(74) *Attorney, Agent, or Firm* — Crowell & Moring LLP (57) ABSTRACT

A secondary battery includes a gas release valve located at a battery container housing a power generating element, wherein: the gas release valve includes a valve disk caused to expand outward by internal pressure in the battery container; wherein a plurality of grooves are formed at the valve disk in order that a plurality of valve element pieces become fractured along the grooves when the valve disk expands due to the internal pressure; and a scatter-deterring portion is formed at the valve disk in order to prevent the fractured valve element pieces along the grooves from scattering away from the valve disk.

5 Claims, 14 Drawing Sheets

XIX   XIII   XIX

SECONDARY BATTERY WITH GAS RELEASE VALVE

INCORPORATION BY REFERENCE

The disclosure of the following priority application is herein incorporated by reference:
Japanese Patent Application No. 2010-041792 filed Feb. 26, 2010

BACKGROUND OF THE INVENTION

1. Field of the Invention

The present invention relates to a secondary battery that includes a gas release valve.

2. Description of Related Art

Research into and development of hybrid and electric vehicles equipped with secondary batteries have been pursued with increasing vigor as a way of addressing various environmental issues in recent years. Since heat may be generated in a secondary battery due to an abnormality, resulting in an increase in battery internal pressure, secondary batteries assuming structures that include a gas release valve have been proposed as a safety measure.

For instance, Japanese Patent Official Gazette No. 4155734 discloses a sealed battery that includes a gas release valve constituted of an area defined by a surrounding groove that is formed at a sealing plate closing off an opening. A safety valve of the battery disclosed in Japanese Patent Official Gazette No. 3222418 includes a circular fracturing groove and a fracture-starting groove formed in an area further inward relative to the fracture groove.

SUMMARY OF THE INVENTION

Both of the gas release valves described above assume a structure whereby the area surrounded by a continuous groove breaks open, giving rise to a concern that fractured pieces may be scattered as the gas is released.

According to the 1st aspect of the present invention, a secondary battery comprises a gas release valve located at a battery container housing a power generating element, wherein: the gas release valve includes a valve disk caused to expand outward by internal pressure in the battery container; wherein a plurality of grooves are formed at the valve disk in order that a plurality of valve element pieces become fractured along the grooves when the valve disk expands due to the internal pressure; and a scatter-deterring portion is formed at the valve disk in order to prevent the fractured valve element pieces along the grooves from scattering away from the valve disk.

According to the 2nd aspect of the present invention, it is preferred that in a secondary battery according to the 1st aspect, retarding areas are further formed at the valve disk, the retarding areas slowing propagation of fracturing along the grooves while the valve disk is being deformed following a start of fracturing at the grooves.

According to the 3rd aspect of the present invention, it is preferred that in a secondary battery according to the 1st aspect, the plurality of grooves include a perimeter groove formed along a perimeter of the gas release valve and an inside groove formed in an inner area surrounded by the perimeter groove; the perimeter groove is made up with a plurality of perimeter groove elements set discontinuously in a circular form; the inside groove is made up with a plurality of inside groove elements radially extending from a central area of the gas release valve toward the perimeter, the inside groove elements dividing an inner area of the valve disk into the plurality of valve element pieces; and ends of the inside groove elements on a perimeter side each reach a discontinuous area formed between the perimeter groove elements.

According to the 4th aspect of the present invention, it is preferred that in a secondary battery according to the 3rd aspect, at least one pair of perimeter groove elements between the discontinuous areas are set along at least one perimeter side of the valve element pieces; and the scatter-deterring portion is set between the pair of perimeter groove elements along the perimeter side of the valve element.

According to the 5th aspect of the present invention, the retarding portion of a second battery according to the 4th aspect may be constituted with the discontinuous area assuming a position between a perimeter-side end of an inside groove element defining the valve element pieces and a perimeter groove element.

According to the 6th aspect of the present invention, it is preferred that in a secondary battery according to the 3rd aspect, the plurality of perimeter groove elements are set so as to form a substantially elliptical shape; and the plurality of inside groove elements are set to achieve symmetry relative to a major axis and a minor axis of the elliptical shape.

According to the 7th aspect of the present invention, it is preferred that in a secondary battery according to the 6th aspect, the inside groove elements are set so that the inner area is divided into two trapezoidal regions assuming a substantially trapezoidal shape and achieving symmetry relative to the major axis, and two triangular regions assuming a substantially triangular shape and set apart from each other along the major axis; the inside groove elements include a first inside groove element and a second inside groove elements, the first inside groove constituting a common top side for the two trapezoidal regions and the second inside groove elements each constituting a common lateral side of a trapezoidal region and a triangular region adjacent to the trapezoidal region; and perimeter-side ends of the second inside groove elements are each located in the discontinuous area formed between the perimeter groove elements.

According to the 8th aspect of the present invention, the perimeter groove elements and the inside groove elements of a secondary battery according to the 3rd aspect may be grooves formed at a surface of the valve disk, with the perimeter groove elements assuming a groove depth smaller than a groove depth of the inside groove elements.

According to the 9th aspect of the present invention, it is preferred that in a secondary battery according to the 1st aspect, the power generating element includes a winding group formed by winding a positive plate and a negative plate via a separator; and the battery container is filled with an electrolyte.

According to the 10th aspect of the present invention, the battery container of a secondary battery according to the 9th aspect may comprise a narrow case and a lid covering an opening end of the case, with the gas release valve disposed at the lid.

By adopting the present invention, it can be ensured that even as a gas release valve opens, no fractured pieces will be scattered.

DESCRIPTION OF PREFERRED EMBODIMENTS

Embodiments of the secondary battery according to the present invention are now described in reference to the drawings.

First Embodiment

Figure 1:
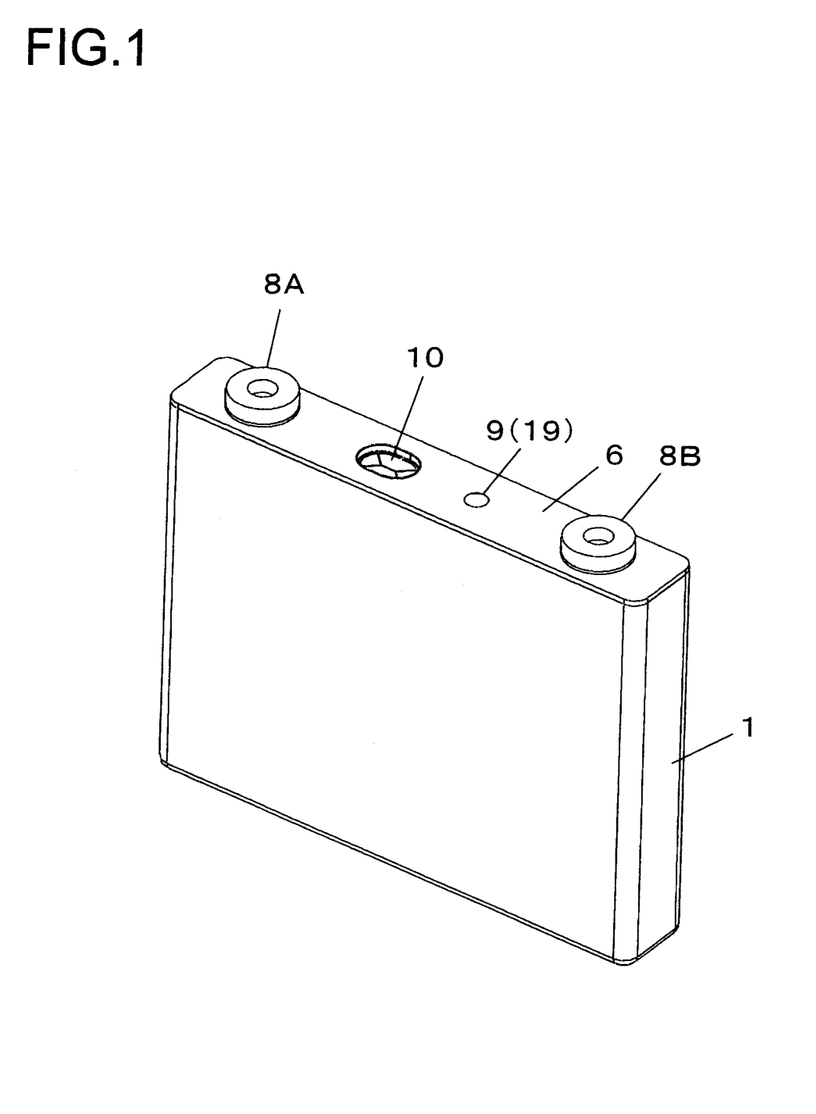
FIG. 1 is a perspective presenting an external view of the secondary battery achieved in a first embodiment of the present invention.

The secondary battery in FIG. 1 includes a case 1 and a lid 6. A power generating element 3 (see FIG. 2) is housed inside the case 1 and the case 1 is sealed with the lid 6. A battery container is manufactured by welding the lid 6 to the case 1. A positive electrode external terminal 8A and a negative electrode external terminal 8B are present at the lid 6. Electric power generated at the power generating element 3 is supplied to an external load via the external terminals 8A and 8B. In addition, electric power externally generated and provided via the external terminals 8A and 8B, charges the power generating element 3.

A gas release valve 10 is formed as an integrated part of the lid 6. As the pressure inside the battery container rises, the gas release valve 10 opens so as to release the gas within the battery container via the valve and thus, the pressure in the battery container is lowered. Through these measures, the safety of the secondary battery is assured.

Figure 2:
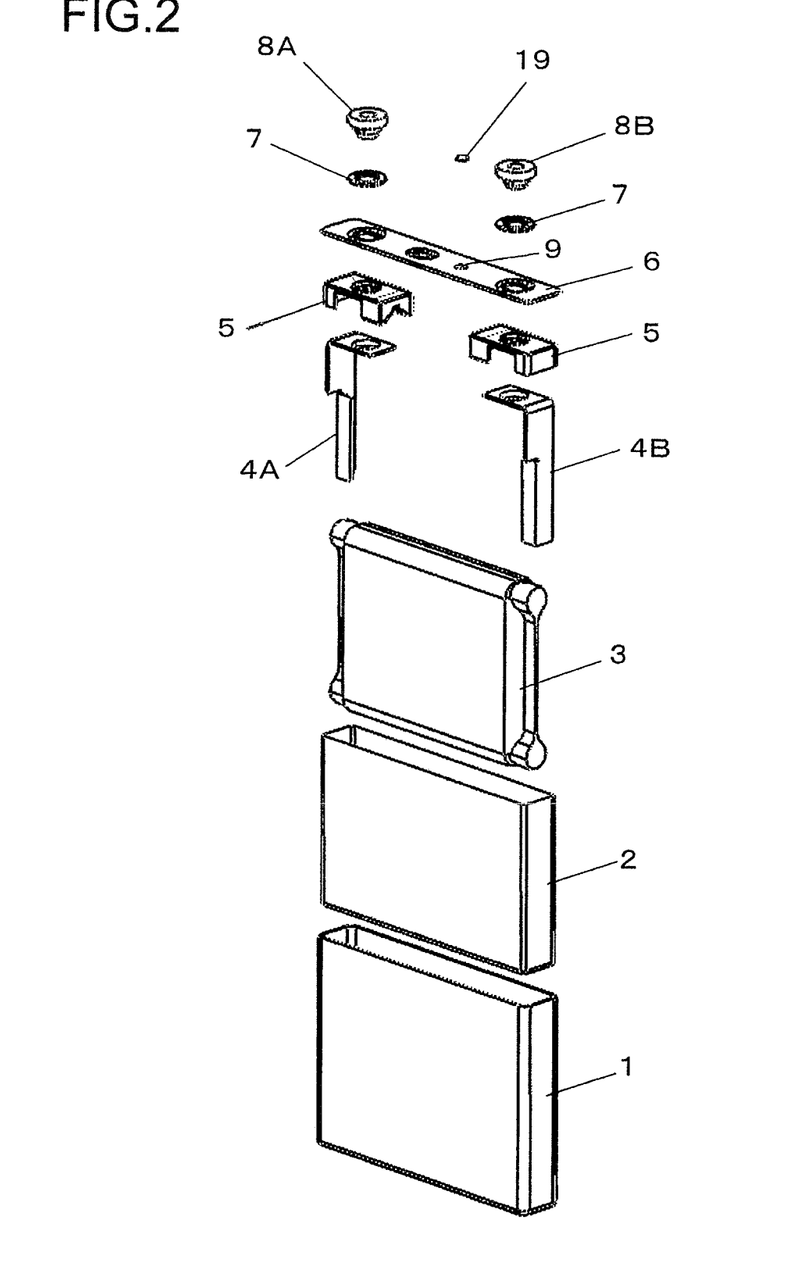
FIG. 2 is an exploded perspective of the secondary battery in FIG. 1.

In reference to FIG. 2, the structure of the battery housed inside the case 1 of the secondary battery is described. The power generating element 3 is housed within an insulating sheet 2 in the case 1 of the secondary battery. The power generating element 3 is constituted with a group of positive and negative electrodes wound in a flat configuration via a separator, and includes exposed electrode foil surfaces (not shown) to which neither an active positive electrode material mix or an active negative electrode material mix is applied, located at the two ends of the winding axis. One end of a positive electrode collector plate 4A and one end of a negative electrode collector plate 4B are respectively connected to a positive electrode connecting area and a negative electrode connecting area constituted with the exposed electrode foil surfaces of the power generating element 3. The other ends of the positive electrode collector plate 4A and the negative electrode collector plate 4B are respectively connected to the positive electrode external terminal 8A and the negative electrode external terminal 8B. Gaskets 5 and insulating rings 7 are disposed at the lid 6, in order to electrically insulate the positive/negative electrode collector plates 4A and 4B and the external terminals 8A and 8P from the lid 6.

An electrolyte filling port 9, through which an electrolyte is injected into the case 1, is formed at the lid 6, and once the case is filled with the electrolyte, the electrolyte filling port 9 is sealed with an electrolyte plug 19.

In reference to FIGS. 3 through 7, the gas release valve 10 is described in detail. The gas release valve 10, formed to assume a smaller wall thickness than the thickness of the lid 6, breaks open when the pressure inside the battery container reaches a level equal to a predetermined value, so as to release the pressure built up within the container.

The lid 6 is formed through press-machining of, for instance, an aluminum alloy plate, and the gas release valve 10, recessed relative to the upper surface of the lid 6, is formed as an integrated part of the lid 6. In other words, a substantially elliptical recessed portion 10a is formed at the upper surface of the lid 6, and the gas release valve 10 is formed with a substantially elliptical thin plate 10b (see FIGS. 3 and 5) constituting the bottom surface of the recessed portion 10a. An inside groove 11 and perimeter grooves 12 are formed through press machining at the surface of the thin plate 10b, which functions as a valve disk of the gas release valve.

Figure 3:
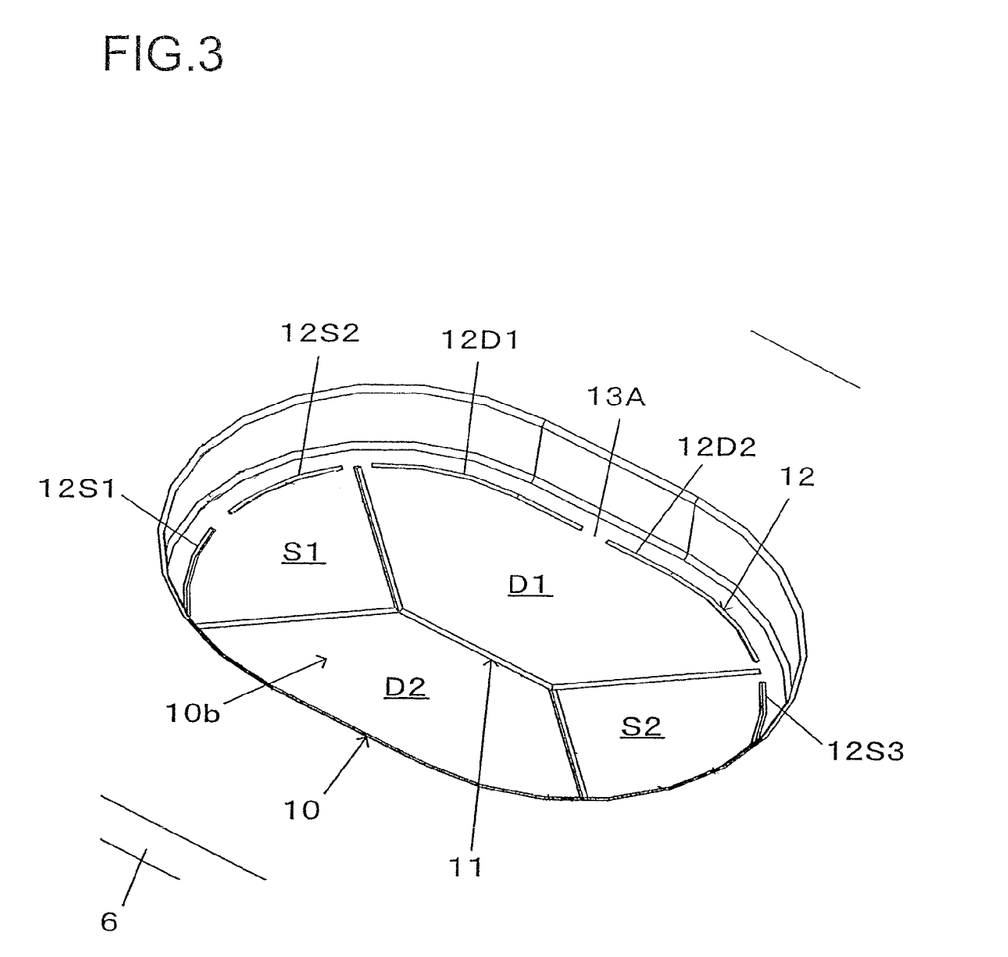
FIG. 3 is an enlarged view of the gas release valve at the secondary battery in FIG. 1.
Figure 4:
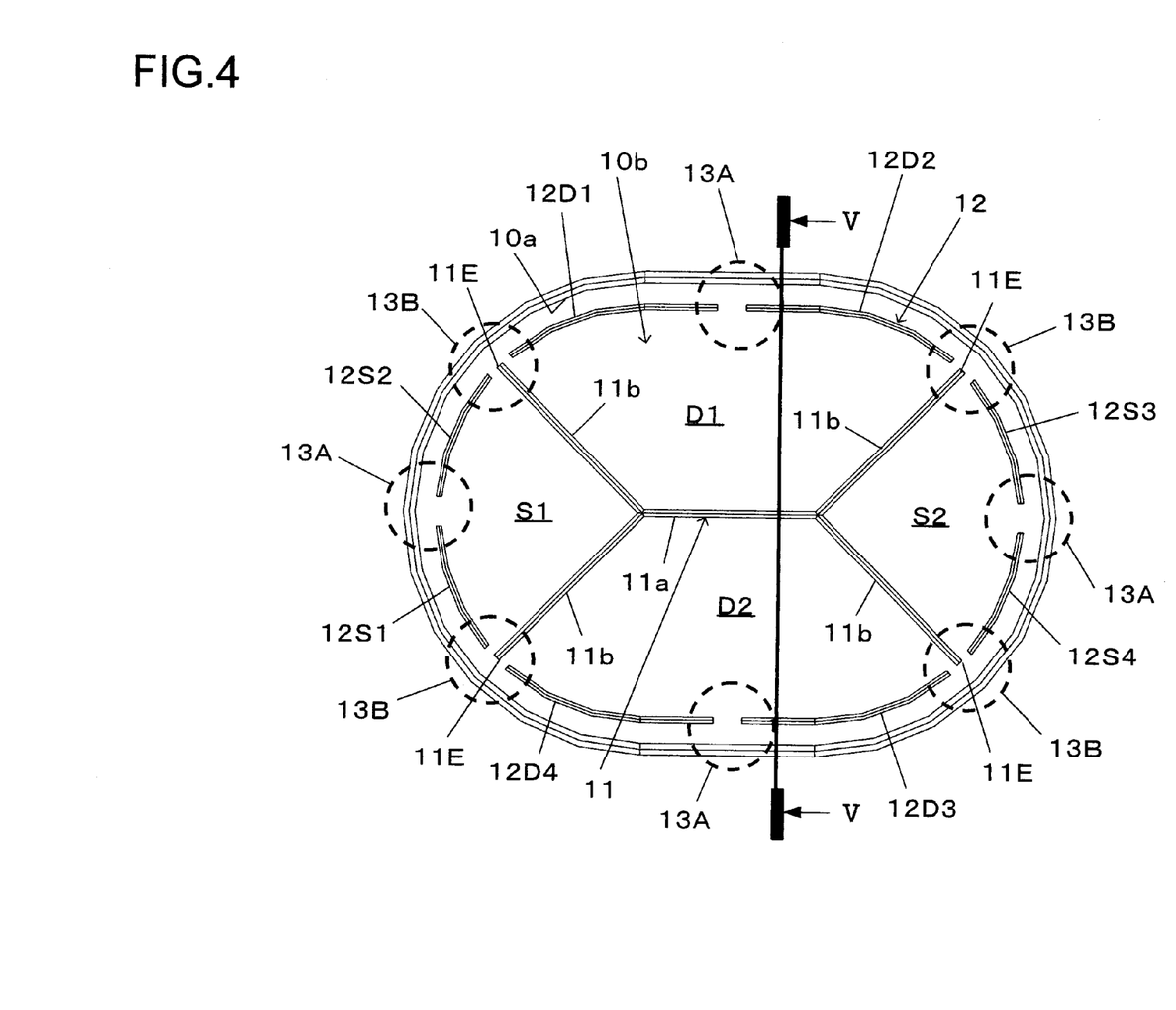
FIG. 4 is a plan view of the gas release valve in FIG. 3.
Figure 5:
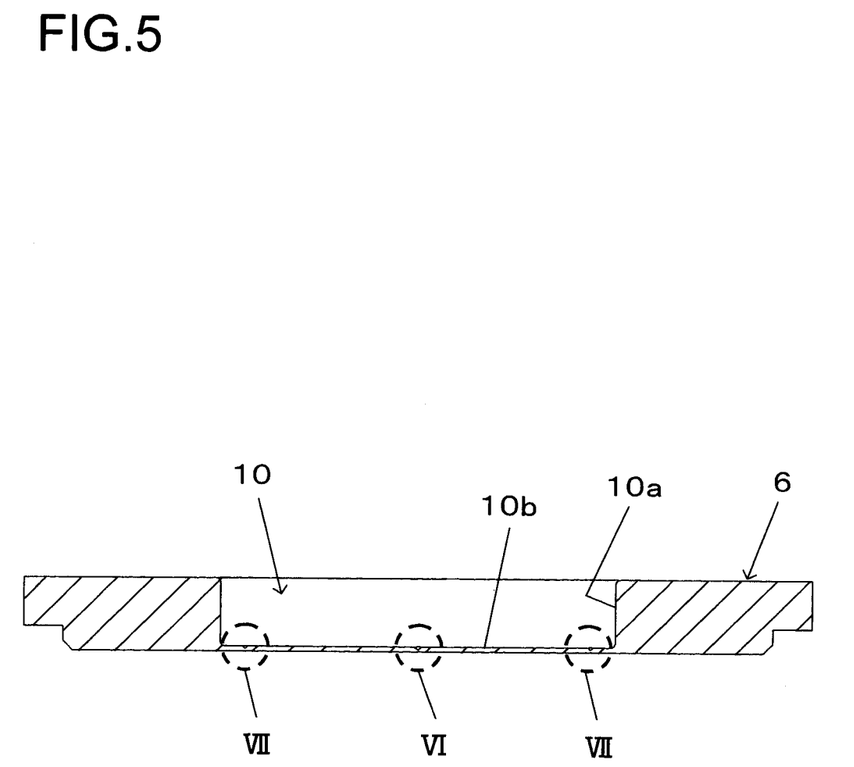
FIG. 5 is a sectional view taken along line V-V in FIG. 4.

As shown in FIGS. 3 and 4, the perimeter grooves 12 include a first groove element group made up with first groove element 12D1 and 12D2, a second groove element group made up with second groove elements 12D3 and 12D4, a third groove element group made up with third groove elements 12S1 and 12S2, and a fourth groove element group made up with fourth groove elements 12S3 and 12S4, ranging along the outer circumference of the recessed portion 10a. First discontinuous areas 13A are formed between the groove elements 12D1 and 12D2 constituting the first groove element group, between the groove elements 12D3 and 12D4 constituting the second groove element group, between the groove elements 12S1 and 12S2 constituting the third groove element group, and between the groove elements 12S3 and 12S4 constituting the fourth groove element group. In addition, second discontinuous areas 13B are formed between the first groove element group and the second groove element group, between the second groove element group and the third groove element group, between the third groove element group and the fourth groove element group and between the fourth groove element group and the first groove element group.

As explained in detail later, the first discontinuous areas 13A fulfill a scatter-deterring function of preventing valve element pieces from becoming separated. The second discontinuous areas 13B function as fracture-retarding portions that slow the process of fracture propagation toward the perimeter grooves from the inside groove.

The inside groove 11, assuming the shape of two letters Y connected to each other, is made up with a single central groove element 11a and four radial groove elements 11b. The groove element 11a extends through the central area of the recessed portion 10a along the major axis of the ellipse. The groove elements 11b each extend radially from an end of the groove element 11a to a discontinuous area 13B. In other words, an end 11E of each groove element 11b is located at a discontinuous area 13.

Figure 6:
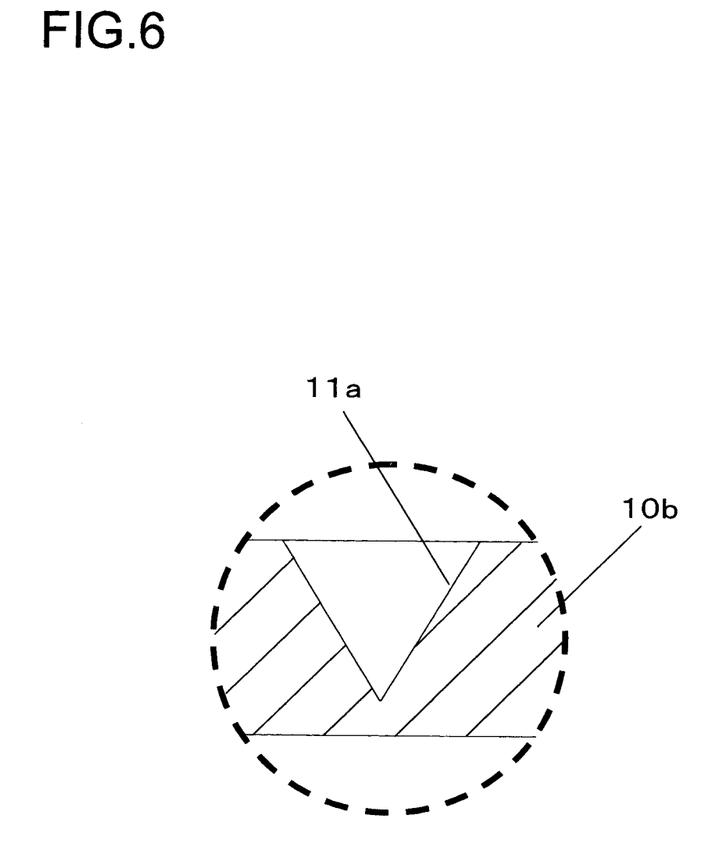
FIG. 6 is an enlarged view of the area VI in FIG. 5.
Figure 7:
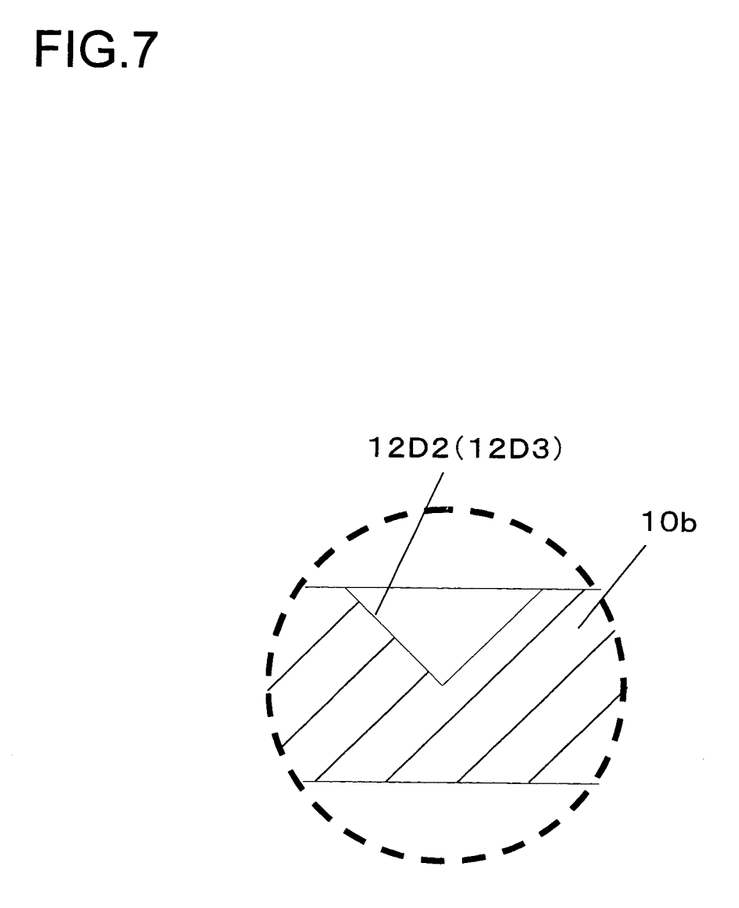
FIG. 7 is an enlarged view of the area VII in FIG. 5.

As shown in FIGS. 6 and 7, the inside groove 11 and the perimeter grooves 12 have triangular sections, and the inside groove 11 is deeper than the perimeter grooves 12, so as to ensure that the fracture of the perimeter grooves 12 will occur later than the fracture of the inside groove 11.

As shown in FIG. 4, four areas, i.e., trapezoidal areas D1 and D2 and triangular areas S1 and S2, are defined by the perimeter grooves 12 and the inside groove 11 at the surface of the substantially elliptical thin plate 10b. The two trapezoidal areas D1 and D2 share a common top side constituted with the inside groove element 11a, whereas the inside groove elements 11b constituting the lateral sides of the trapezoidal areas D1 and D2 are also the lateral sides of the adjacent triangular areas S1 and S2.

The trapezoidal areas D1 and D2 and the triangular areas S1 and S2 are formed so that as the internal pressure in the battery container rises to a level equal to or higher than a predetermined value and the fracture occurs at the inside groove 11, the trapezoidal areas D1 and D2 and the triangular areas S1 and S2 open at the perimeter grooves 12, which act as hinges (deformation fulcrums). As a result, the battery container opens along the upward direction. Accordingly, the four areas, i.e., the trapezoidal areas D1 and D2 and the triangular areas S1 and S2, will each be referred to as a valve element piece.

The operation and advantages of the gas release valve 10 structured as described above are explained.

As the pressure inside the battery container rises, the thin plate (valve disk) 10b expands outward, inducing tensile stress in the inside groove 11. As the internal pressure reaches a level equal to or higher than the predetermined value, fracture occurs along the inside groove 11 and the valve element pieces open outward. In other words, the internal pressure within the container causes the gas release valve 10 to be separated into the two trapezoidal areas D1 and D2 and the two triangular areas S1 and S2. This means that as the trapezoidal areas D1 and D2 and the two triangular areas S1 and S2 are pushed up toward the outside while they separate from one another, a large opening is formed at the gas release valve 10.

Figure 8:
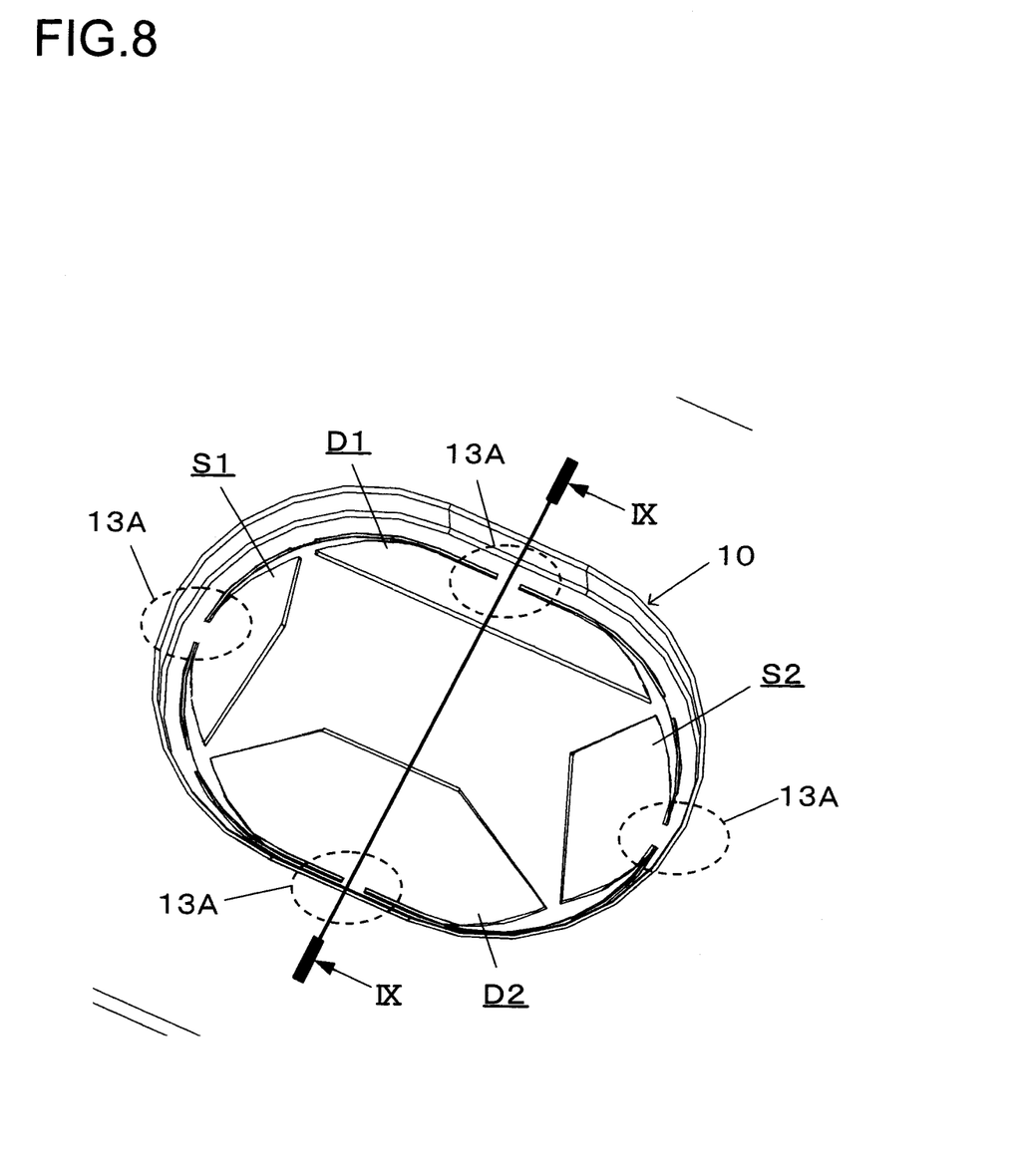
FIG. 8 is a perspective of the gas release valve in FIG. 4 in an open state.
Figure 9:
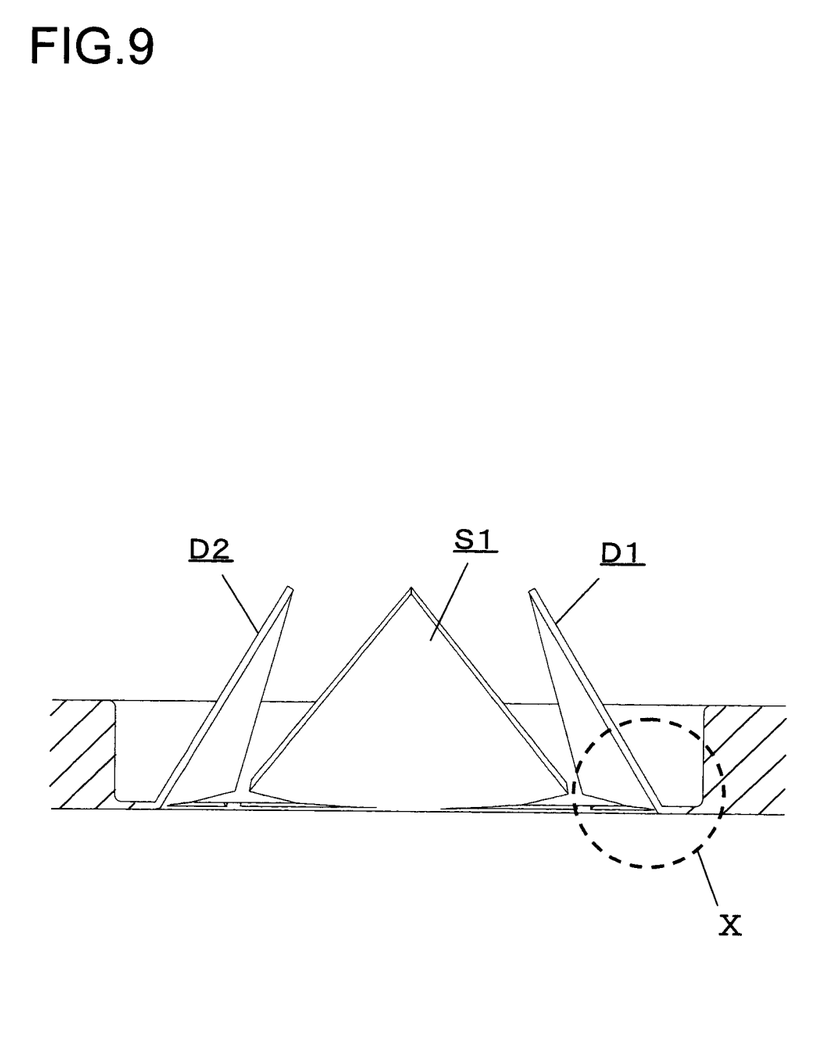
FIG. 9 is a sectional view taken along line IX-IX in FIG. 8.

At this time, the trapezoidal areas D1 and D2 are pushed up along the minor axis of the ellipse, whereas the triangular areas S1 and S2 are pushed up along the major axis of the ellipse, as shown in FIGS. 8 and 9. The inside groove 11, formed to achieve symmetry both along the minor axis and along the major axis of the ellipse, becomes fractured evenly in all directions. Thus, since the fracture occurs evenly over the entire surface of the gas release valve 10, the gas will be smoothly released.

The outer ends 11E of the radial groove elements 11b are located in the discontinuous areas 13B between the groove element groups constituting the perimeter grooves 12. As the fracture propagates along the radial groove elements 11b and the resulting cracks reach the outer ends 11E, the trapezoidal areas D1 and D2 and the triangular areas S1 and S2 will be pushed up and out to a significant extent. Namely, the thin plate 10b becomes greatly deformed (ruptures). As a result, a large opening is formed at the gas release valve 10 to allow the gas inside to be promptly released.

As the valve element pieces open outward with the perimeter grooves 12 as hinge points, propagation of fracturing along the radial groove elements 11b toward the groove elements constituting the perimeter grooves 12 is retarded via the discontinuous areas 13B. Then, only after the entire inside groove 11 has completely fractured, the groove elements constituting the perimeter grooves 12 begin to fracture. Thus, the trapezoidal areas D1 and D2 and the triangular areas S1 and S2 are allowed to open outward evenly, instead of becoming partially pushed up.

In addition, since the discontinuous areas 13A are each formed between the pair of groove elements constituting a given groove element group, i.e., between the pair of groove elements 12D1 and 12D2, between the pair of groove elements 12D3 and 12D4, between the pair of groove elements 12S1 and 12S2 or between the pair of groove elements 12S3 and 12S4, at the center of the particular groove element group, the trapezoidal areas D1 and D2 and the triangular areas S1 and S2 are held in a stable manner while they open up.

Figure 10:
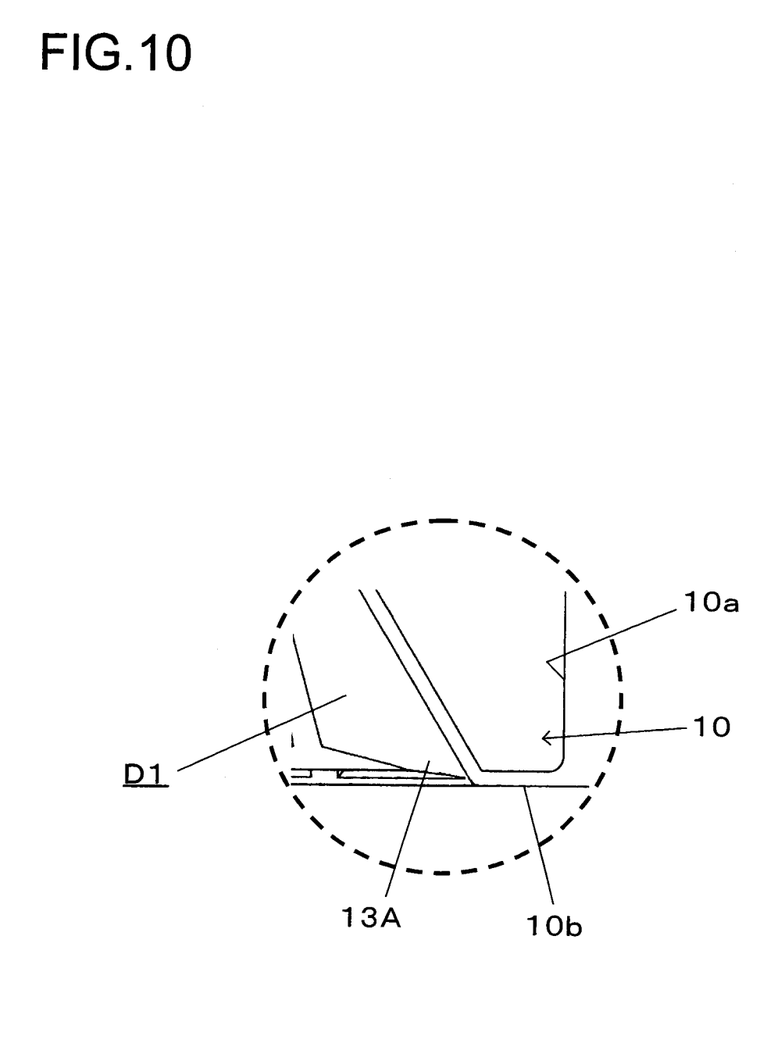
FIG. 10 is a sectional view of the area X in FIG. 9.

Once the gas release valve 10 opens to a sufficient extent, the trapezoidal areas D1 and D2 and the triangular areas S1 and S2, still supported at the discontinuous areas 13A, are further pushed up and out, thereby forming an ample opening, as shown in FIGS. 8 through 10. In other words, the thin plate (valve disk) 10b undergoes further deformation. Consequently, as the pressure inside the battery container reaches the predetermined value, a major fracture can be promptly induced at the inside groove 11 without scattering the valve element pieces.

By adopting the release valve structure achieved in the first embodiment described above, an ample opening area can be assured without allowing the thin plate 10b constituting the gas release valve 10, i.e., the valve disk, to become separated as broken pieces.

Second Embodiment

Next, the second embodiment of the secondary battery according to the present invention is described in reference to FIGS. 11 through 14. The second embodiment is characterized by inside grooves 11 forming an X shape. In FIGS. 11 through 14, the same reference numerals are assigned to parts identical to or equivalent to those in the first embodiment to preclude the necessity for a repeated explanation thereof.

Figure 11:
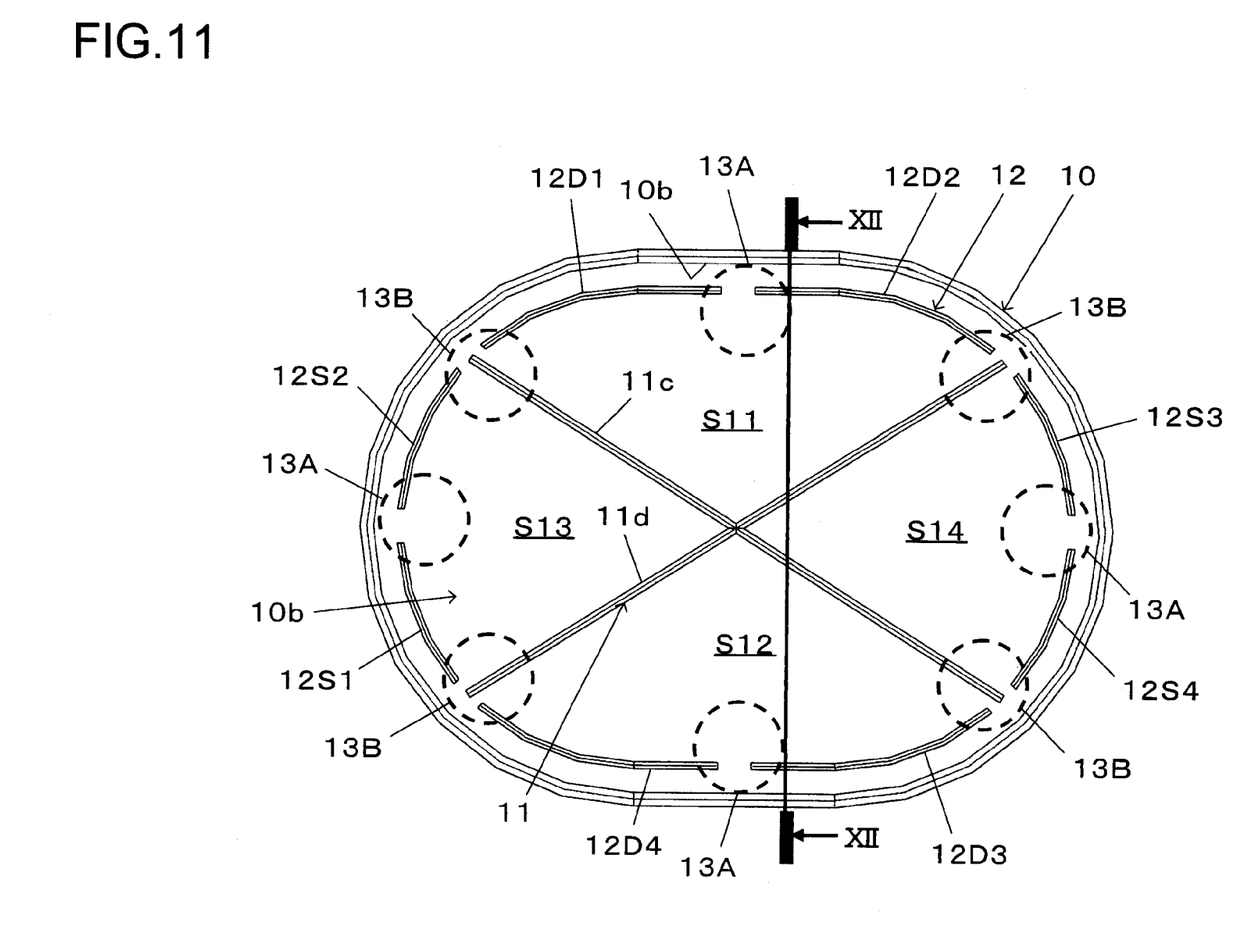
FIG. 11 is a plan view of the gas release valve at the secondary battery achieved in a second embodiment of the present invention.
Figure 12:
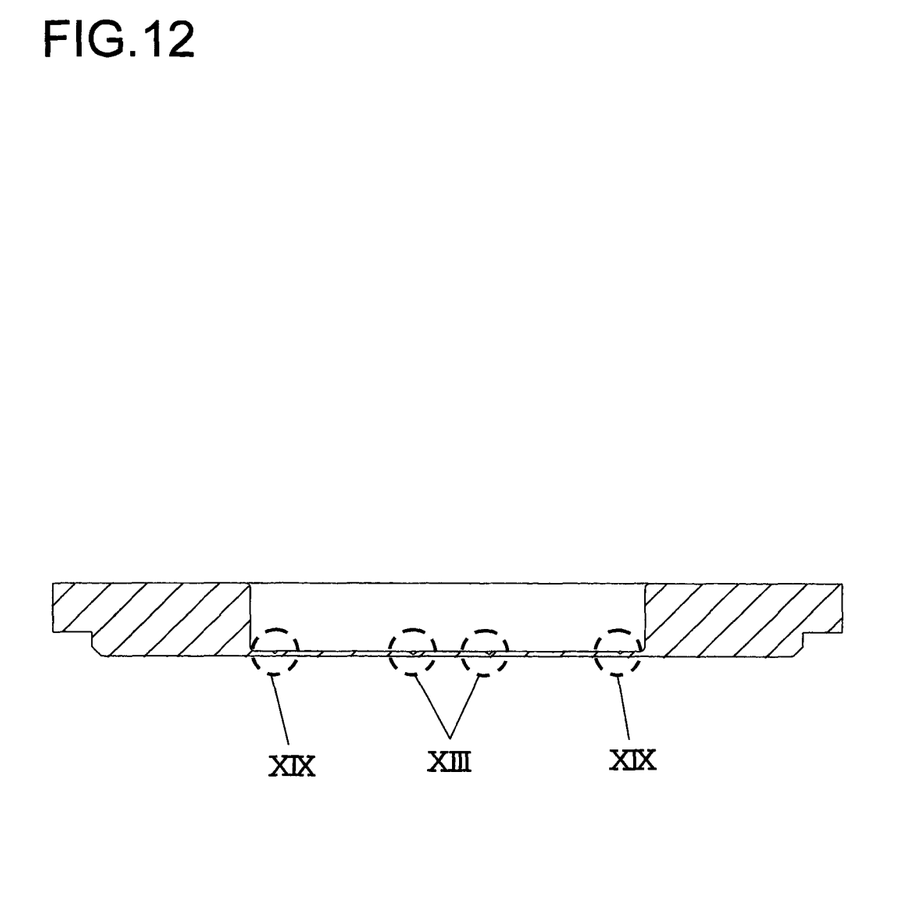
FIG. 12 is a sectional view taken along line XII-XII in FIG. 11.
Figure 13:
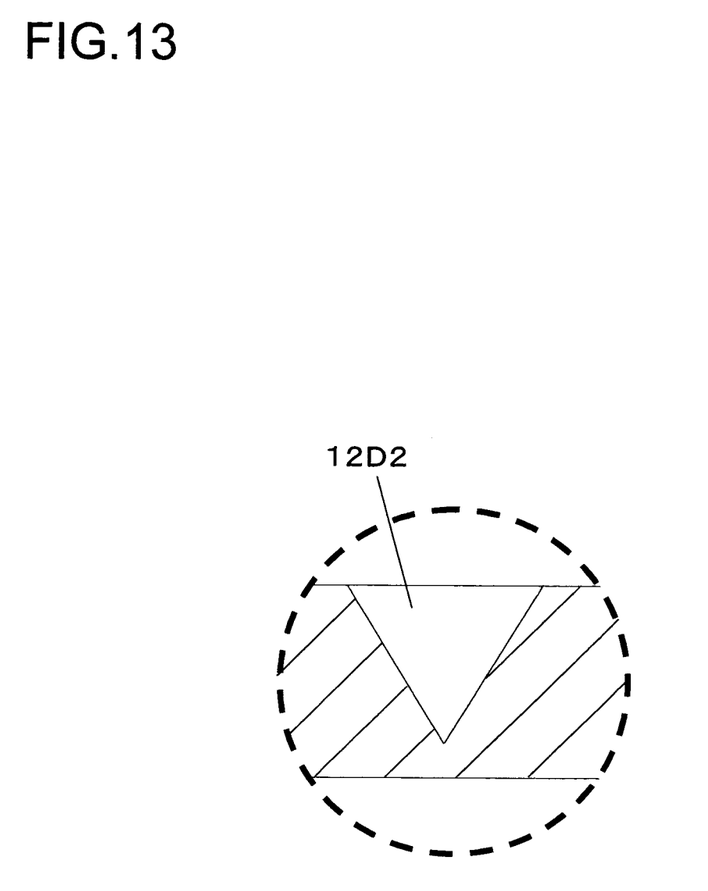
FIG. 13 is an enlarged view of the area XIII in FIG. 12.
Figure 14:
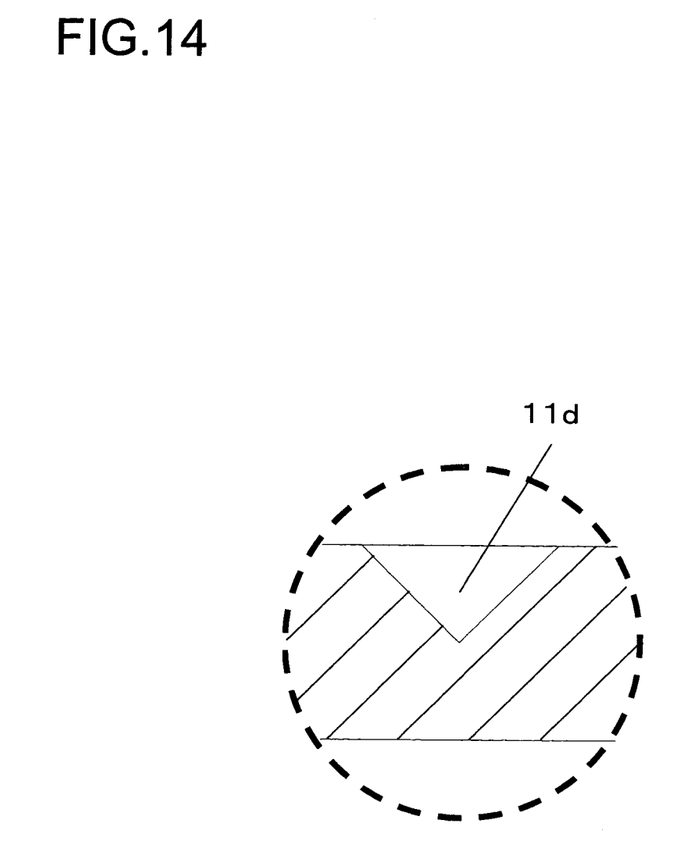
FIG. 14 is an enlarged view of the area XIV in FIG. 12.

As shown in FIG. 11, the inside grooves 11 are made up with linear grooves 11c and 11d symmetrical to each other, intersecting each other at the center of the ellipse, extending diagonally relative to both the major axis and the minor axis of the ellipse, and together forming the letter X. The inside grooves 11 divide the gas release valve 10 into four triangular areas S11 to S14 with a shared apex located at the center of the ellipse and the base sides thereof constituted with perimeter grooves 12.

As the pressure inside the battery container rises, the thin plate (valve disk) 10b expands outward, inducing tensile stress at the inside grooves 11. As the internal pressure reaches a level equal to or higher than the predetermined value, the inside grooves 11 fracture and the valve element pieces S11 through S14 constituted of the triangular areas open outward. In other words, the internal pressure within the container causes the thin plate 10b at the gas release valve 10 to be separated into the four triangular valve element pieces S11 to S14. This means that as the triangular valve element pieces S11 to S14 are pushed up toward the outside while they separate from one another, a large opening is formed at the gas release valve 10.

It is to be noted that once the valve element pieces S11 to S14 constituted of the triangular areas are pushed up and out with the perimeter grooves 12 forming the base sides thereof acting as hinge points, the fracture develops in the discontinuous areas 13B. When the releasing motion of the valve element pieces S11 through S14 ends, the valve element pieces S11 through S14 will be held to the thin plate 10b, i.e., the valve disk, only through the discontinuous areas 13A.

Advantages similar to those of the first embodiment are achieved through the second embodiment.

—Variations—

The secondary battery with a gas release valve according to the present invention allows for the following variations.

(1) While the gas release valve 10 is formed as an integrated part of the lid 6, a gas release valve formed separately may be disposed so as to cover an opening at the lid 6. Such a gas release valve 10 may be similar to the gas release valve 10 in the first embodiment and fulfill functions similar to those of the gas release valve 10 in the first embodiment.

(2) While the gas release valve 10 is formed at the lid 6, the gas release valve 10 may be formed as an integrated part of the case 1 instead. As a further alternative, a gas release valve formed separately may be disposed at the case 1.

(3) While the lid 6 in the embodiments described above is constituted of aluminum, the present invention may be adopted in conjunction with a lid constituted of SUS. In such a case, the gas release valve constituted of nickel should be attached so as to cover a gas release port formed at the lid with the valve disk.

(4) While the inside groove 11 and the perimeter grooves 12 in the embodiments described above have triangular sections, the present invention may instead be adopted in conjunction with grooves having circular arc sections. In addition, the inside groove 11 and the perimeter grooves 12 may have sections assuming shapes different from one another, as long as they are formed to achieve shapes and strengths that allow the fracture to occur at the inside groove 11 ahead of the perimeter grooves 12, to induce the gas release valve 10 to open by causing the valve element pieces to be pushed up.

(5) While the gas release valve 10 described above assumes an elliptical shape, the present invention may be adopted in a gas release valve formed in any of various shapes including a circular shape and a projecting polygonal shape. The perimeter groove elements in the gas release valve assuming an alternative shape should form a discontinuous circle along the perimeter of the gas release valve.

(6) While the valve element pieces, too, may be formed in shapes other than those described in reference to the embodiments, it is desirable that the valve element pieces assume a shape that allows the valve element pieces to open up and out.

(7) The present invention may be adopted in a gas release valve disposed at the top cover of a cylindrical secondary battery instead of a prismatic secondary battery.

(8) The inside groove 11 and the perimeter grooves 12 may be formed in shapes other than those described in reference to the embodiments.

(9) It is not crucial that two different types of discontinuous areas 13A and 13B be formed between the perimeter grooves 12 as in the embodiments described above, as long as the discontinuous areas 13A to function as scatter-deterring portions are formed at the gas release valve.

The embodiments described above and variations thereof are simply provided as examples and the present invention is not limited in any way whatsoever to the particulars of the embodiments or the variations.

Accordingly, the present invention may be adopted in any of various types of secondary batteries, as long as the secondary battery includes a gas release valve disposed at a battery container housing a power generating element, the gas release valve includes a valve disk that is caused to expand toward the outside by pressure built up inside the battery container, and a plurality of grooves, along which the expanding valve disk fractures into a plurality of valve element pieces and a scatter-deterring portion that prevents scattering of the plurality of valve element pieces as the valve breaks open, are formed at the valve disk.

The above described embodiments are examples and various modifications can be made without departing from the scope of the invention.

What is claimed is:

1. A secondary battery comprising a gas release valve located at a battery container housing a power generating element, wherein:

the gas release valve includes a valve disk caused to expand outward by internal pressure in the battery container; wherein a plurality of grooves is formed at the valve disk in order that a plurality of valve element pieces becomes fractured along the grooves when the valve disk expands due to the internal pressure;

a scatter-deterring portion is formed at the valve disk in order to prevent the fractured valve element pieces along the grooves from scattering away from the valve disk; and retarding areas that slow propagation of fracturing along the grooves while the valve disk is being deformed following a start of fracturing at the grooves are formed, wherein the plurality of grooves includes a perimeter groove formed along a perimeter of the gas release valve and an inside groove formed in an inner area surrounded by the perimeter groove;

the perimeter groove includes a plurality of perimeter groove elements set discontinuously in a circular form;

the inside groove includes a plurality of inside groove elements radially extending from a central area of the gas release valve toward the perimeter, the inside groove elements dividing an inner area of the valve disk into the plurality of valve element pieces;

at least one pair of perimeter groove elements between first discontinuous areas is set along at least one perimeter side of the valve element pieces;

ends of the inside groove elements on a perimeter side each reach a second discontinuous area formed between the perimeter groove elements;

the scatter-deterring portion is constituted with the first discontinuous area set between the pair of perimeter groove elements along the perimeter side of the valve element;

the retarding area is constituted with the second discontinuous area assuming a position between a perimeter-side end of the inside groove element defining the valve element pieces and the perimeter groove element; and the perimeter groove elements and the inside groove elements are grooves formed at a surface of the valve disk, with the perimeter groove elements assuming a groove depth smaller than a groove depth of the inside groove elements.

2. A secondary battery according to claim 1, wherein:

the plurality of perimeter groove elements are set so as to form a substantially elliptical shape; and the plurality of inside groove elements are set to achieve symmetry relative to a major axis and a minor axis of the elliptical shape.

3. A secondary battery according to claim 2, wherein:

the inside groove elements are set so that the inner area is divided into two trapezoidal regions assuming a substantially trapezoidal shape and achieving symmetry relative to the major axis, and two triangular regions assuming a substantially triangular shape and set apart from each other along the major axis;

the inside groove elements include a first inside groove element and a second inside groove elements, the first inside groove constituting a common top side for the two trapezoidal regions and the second inside groove elements each constituting a common lateral side of a trapezoidal region and a triangular region adjacent to the trapezoidal region; and perimeter-side ends of the second inside groove elements are each located in the discontinuous area formed between the perimeter groove elements.

4. A secondary battery according to claim 1, wherein:

the power generating element includes a winding group formed by winding a positive plate and a negative plate via a separator; and the battery container is filled with an electrolyte.

5. A secondary battery according to claim 4, wherein:

the battery container comprises a narrow case and a lid covering an opening end of the case, with the gas release valve disposed at the lid.

\* \* \* \* \*